United States Patent [19]

Moran et al.

[11] 3,835,329

[45] Sept. 10, 1974

[54] METHOD OF MEASURING FAST NEUTRON FLUX USING THERMOLUMINESCENT DOSIMETER

[75] Inventors: Paul R. Moran; David W. Pearson, both of Madison, Wis.

[73] Assignee: The United States of America as represented by the United States Atomic Energy Commission, Washington, D.C.

[22] Filed: Aug. 23, 1973

[21] Appl. No.: 390,970

[52] U.S. Cl. .............................................. 250/484
[51] Int. Cl. ............................................. G01t 1/11
[58] Field of Search .......... 250/337, 390, 391, 472, 250/473, 484

[56] References Cited
UNITED STATES PATENTS
3,562,480  2/1971  Korba .............................. 250/484

Primary Examiner—James W. Lawrence
Assistant Examiner—Davis L. Willis
Attorney, Agent, or Firm—John A. Horan; Arthur A. Churm; Hugh Glenn

[57] ABSTRACT

Thermoluminescent phosphors which are susceptible to neutron activation are exposed to a mixed field of radiation. Thermoluminescence resulting from prompt gamma irradiation is removed by a short period of annealing at a high temperature. The phosphors are then stored in a shielded chamber maintained at a sufficiently low temperature to allow accumulation of radiation dose produced by radionuclides formed on neutron activation. The thermoluminescence attributable to this self-irradiation dose is read and correlated to neutron flux or dose. Through use of separate phosphor materials having different threshold energies for neutron activation, energy spectra of fast neutron flux is obtained.

10 Claims, 5 Drawing Figures

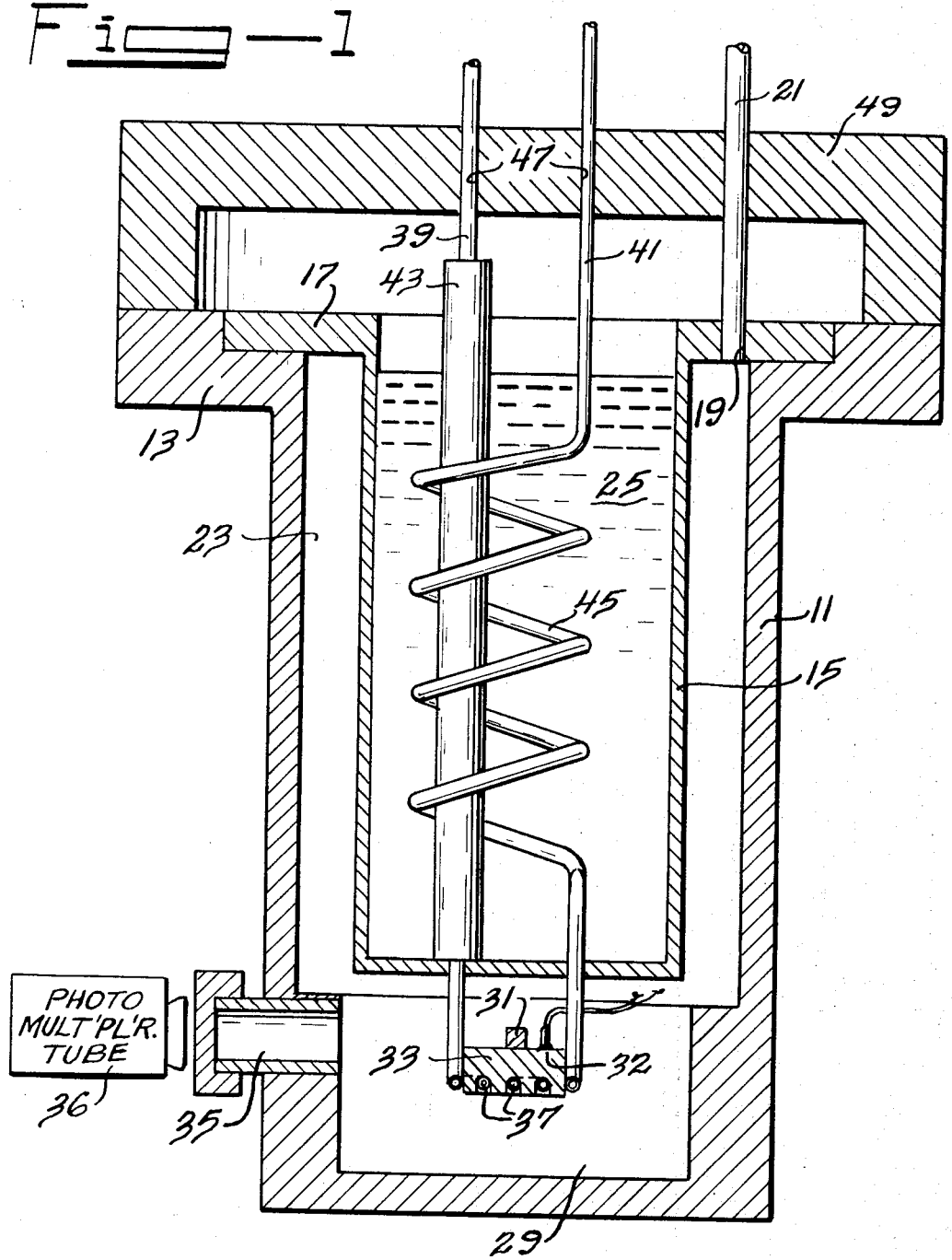

METHOD OF MEASURING FAST NEUTRON FLUX USING THERMOLUMINESCENT DOSIMETER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the use of thermoluminescent phosphors for the measurement of radiation dose produced by neutrom flux. In particular, it relates to methods for measuring fast neutron flux in the presence of a mixed radiation field including thermal neutrons and gamma radiation. It can be used in area or personnel monitoring within a nuclear facility or in monitoring the dose administered to a patient who is undergoing neutron radiotherapy.

Thermoluminescent phosphors are recognized as important and efficient means for making radiation measurements. These materials are capable of storing, as metastable electron states or traps, some of the energy absorbed during exposure to ionizing radiation. On heating, this stored energy is emitted in the form of light quanta which is photometrically detected and related to the radiation exposure.

A plot of the intensity of the thermoluminescence as a function of temperature is called a glow curve having maxima called glow peaks. The size of a glow peak is directly related to the amount of ionizing radiation absorbed since the phosphor was last heated to a temperature above that corresponding to the peak. A particular glow peak will appear on the curve only if the irradiation occurred at a temperature well below that of the flow peak.

Neutron radiation can produce metastable electron states within thermoluminescent phosphors in a number of ways. Elastic scattering reactions with resulting nuclei and particle recoil can cause ionization and trap energy within the phosphor materials. Neutron reactions with the various elements within the phosphors produce prompt gamma radiation as well as the characteristic decay of activated radionuclides. Ordinarily the prompt gamma radiation will be of much larger magnitude than the radiation produced by radionuclide decay. In mixed radiation fields including large flux of gamma and other ionizing radiation, it is difficult to distinguish between incident radiation and prompt gammas produced by neutron reactions.

One problem which arises in measuring dose resulting from mixed radiation fields is in the relative sensitivity of neutron and other types of radiation. Sensitivity of a thermoluminescent phosphor is the amount of thermoluminescence produced by the radiation energy absorbed. In particular, most thermoluminescent phosphors have lower sensitivity for fast neutrons than for direct gamma radiation. Consequently, determination of fast neutron dose and total dose in a mixed field including both fast neutrons and gamma is difficult with conventional thermoluminescent methods.

One method of measuring neutron dose in the presence of gamma radiation is through use of activation dosimetry. Foils of material that have become radioactive from neutron bombardment are monitored in a radiation counter and the radioactive decay related to the neutron exposure. Alternatively, a thermoluminescent phosphor is exposed to neutron radiation causing activation of nuclei within the phosphor. After a period of storage, the thermoluminescence induced by self-irradiation is read to estimate the neutron exposure. Prior use of thermoluminescent phosphors in this manner has been limited to thermal and low energy neutrons due to the comparatively lower sensitivity of ordinary phosphor materials to fast neutrons.

SUMMARY OF THE INVENTION

Therefore, in view of the limitation of the prior art, it is an object of the present invention to provide a method for determining fast neutron flux in a mixed radiation field.

It is also an object to provide a method of using thermoluminescent phosphors to determine fast neutron flux in the presence of thermal neutrons.

It is a further object to provide a method of resolving fast neutron spectra with thermoluminescent dosimeters.

In accordance with the present invention a thermoluminescent phosphor is exposed to a mixed radiation field including fast neutron fluence and then annealed at a high temperature for a short period of time to release theremoluminescence resulting from prompt dose. The phosphors are then stored at an effective temperature within a shielded chamber for a sufficient period of time to permit radionuclides produced by neutron activation to irradiate the phosphor material. A portion of the radiation energy released by the radionuclides is trapped in metastable electron states within the phosphors. The phosphors are then heated and the trapped energy photometrically read as thermoluminescence and related to neutron fluence within the radiation field.

One aspect of the invention involves maintaining the phosphor at a cryogenic temperature as the neutron activation products decay to produce metastable electron states. Increased sensitivity can thereby be obtained through reading the resulting, low-temperature glow peaks as well as peaks which appear above ambient temperature. This procedure is particularly applicable when pure phosphors are selected for use to avoid biasing agents that are sensitive to thermal neutrons.

BRIEF DESCRIPTION OF THE DRAWINGS

The present invention is illustrated in the accompanying drawings wherein:

FIG. 1 is an elevation view of a cryostat that can be used in carrying out one aspect of the method of the invention.

DETAILED DESCRIPTION OF THE PREFERRED EMBODIMENTS

In practicing the method of the present invention, thermoluminescent phosphors are suitably prepared for radiation exposure. The phosphors can be in powdered or solid form and contained within a suitable vessel or holder. When used to measure environmental dose around or in a nuclear facility, the phosphors can be contained in a small vessel with thin walls. If worn by an individual, the phosphors can be held in a metal holder or metal holder portion and attached as a badge to the individual's clothing. Powdered phosphors can be encapsulated in gelatine or fused quartz capsules for primary containment. The holder or vessel should be constructed of materials which will contribute minimal absorption or moderation to the neutron flux, such as thin layers of aluminum or polytetrafluoroethylene.

The phosphors are exposed to the field of radiation in question, for instance, in radioactive areas of a nuclear facility or on a patient undergoing neutron radiotherapy. During exposure, neutron radiation will activate elements to form radionuclides within the phosphors. For the identification of fast neutron flux, elements such as fluorine, aluminum, magnesium and sulfur are particularly suitable, as they have high, e.g. 2.5 MeV and above, threshold energies for neutron capture.

After exposure the phosophors are annealed at a high temperature to remove all of the thermoluminescence induced by the direct interaction of incident neutrons and gammas with the phosphor material. The effect of prompt gamma radiation from within the phsophors is also erased. Temperatures of about 500° C. for about 5 minutes have been found suitable for this purpose. As the phosphors are heated to the annealing temperature, the thermoluminescence emitted can be measured to determine the total dose from both neutrons and other incident radiation. It is important that all of this intitial thermoluminescence be removed since it is often a thousand times greater than the thermoluminescence subsequently induced by radioactive decay. Therefore, the temperature employed in this step is higher than those employed in the subsequent heating step for reading the self-irradiation dose.

After annealing, the phosphors are cooled and stored in a shielded chamber at or below ambient temperature and low background radiation while the neutron-activated radionuclides decay. The period of storage and decay is made sufficiently long for each phosphor to absorb a detectable level of energy in metastable electron states. For example, a storage period of about one to twelve half-lives of the activated radionuclides which are effective to produce these metastable electron states will ordinarily be of sufficient length. Self-irradiation for more than six half-lives will measure nearly all of the decay. Nothing is gained by storage beyond the time when the dose rate for background radioactivity is equal to that from the induced activity.

Figure 2A:
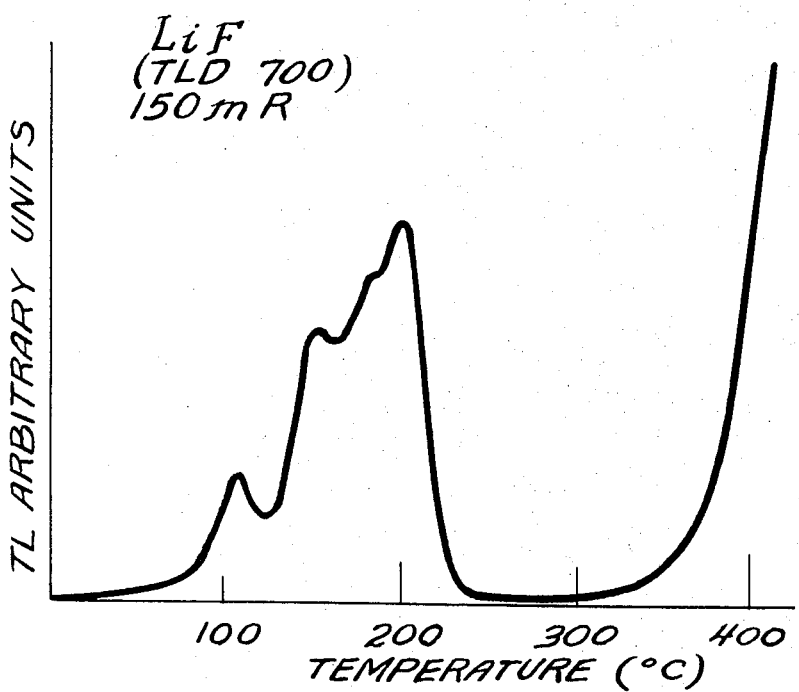
FIGS. 2a, 2b and 2c are graphs of glow curves produced with various phosphors.
Figure 2B:
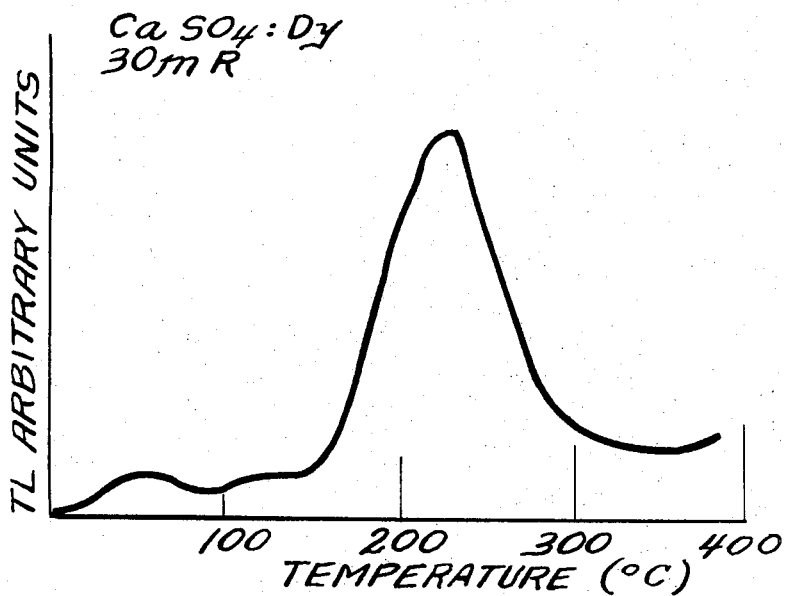
Figure 2C:
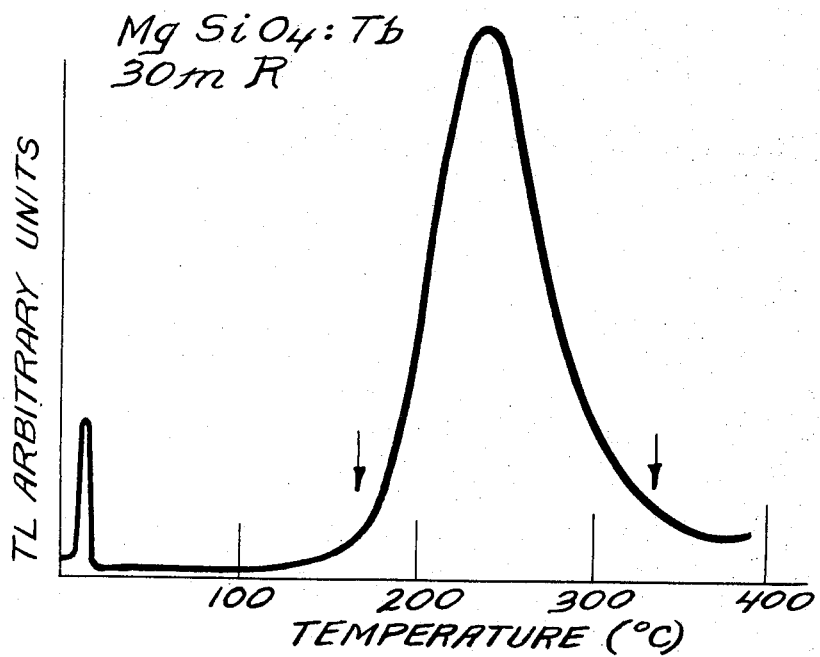

Following the storage period, the thermoluminescence resulting from radionuclide decay within the phosphors is read. In reading the phosphors, the energy stored in the metastable electron traps is released as scintillating phosphorescence by elevating the temperature and detected with a commercially available, reader device. Typical temperature ranges from the storage temperature to near 400° C. are used in reading the fluoride-salt phosphors and plotting glow curves. FIGS. 2a, 2b, and 2c illustrate glow curves for various phosphors stored at ambient temperature with the arrows showing the range limits over which the thermoluminescence was integrated to arrive at the indicated dose.

A reader will normally include a closed chamber for receiving and heating phosphors along with a photoelectric device for counting the resulting light photons. Readers of this type and methods of their use are more fully described in Cameron et al., *Thermoluminescent Dosimetry*, 75–100, University of Wisconsin Press, 1968.

In order to increase the sensitivity to fast neutrons of some phosphors, notably the fluoride salts of the alkali metals and the alkali earth metals, the above storage and self-irradiation is carried out at cryogenic temperatures. Temperatures below 100° K. which can be obtained with liquid nitrogen refrigerant have been found to produce a substantial increase in sensitivity for thermoluminescence measurements as compared to storage and self-irradiation at near ambient temperatures. For full benfit of this increased sensitivity, the subsequent reading of the phosphor must begin at the cryogenic storage temperatures.

FIG. 1 shows a combination cryostat and shielded chamber that can be used in performing the above shielded storage and reading steps. An outer container 11 of sufficient metal thickness to act as a radiation shield includes a flanged mouth portion 13 at its upper end and a chamber 29 for containing the phosphors at its lower end. An inner flask 15 includes a corresponding flange portion 17 from which it depends into container 11. Flange portion 17 has a port 19 for connection of a vacuum source 21 for the evacuation of the annulus 23 between container 11 and flask 15 as well as chamber 29. A Dewar-type vessel can thereby be formed for containing liquid nitrogen 25.

Two sections of copper tubing 39 and 41 pass through the liquid nitrogen 25 within flask 15 and interconnect through passageways 37 within a sample block 33. Sample block 33 is supported by the tubing within chamber 29 and is shown with a phosphor 31 disposed on its upper surface. The phosphor 31 is preferably firmly clamped to the sample block to promote heat transfer and a thermocouple 32 or other temperature measurement means closely placed to monitor the temperature of the phosphor. The phosphor 31 is directly aligned in an unimpeded path with a convered port 35 which can be opened to allow exposure to a photomultiplier tube or other photoelectric device 36 associated with a thermoluminescence reader.

The portion of tubing section 39 that passes through the liquid nitrogen is enclosed within an evacuated or cryogenically insulated sheath 43. Section 41 is exposed to the cold nitrogen liquid and includes a coiled portion 45 for added heat transfer area. Both of the tubes extend outside the vessel through openings 47 in an upper shield or lid 49. Sufficient openings are provided in lid 49 to pass the various tubes and other instrumentation, such as thermocouple leads, as well as to provide venting for nitrogen vapor.

During the cryogenic storage step a flow of nitrogen gas is admitted through tubing section 41 and discharged through section 39. The nitrogen gas is thus cooled in coil 45 to maintain the sample block 33 and phosphors 31 at near liquid nitrogen temperature.

Figure 3:
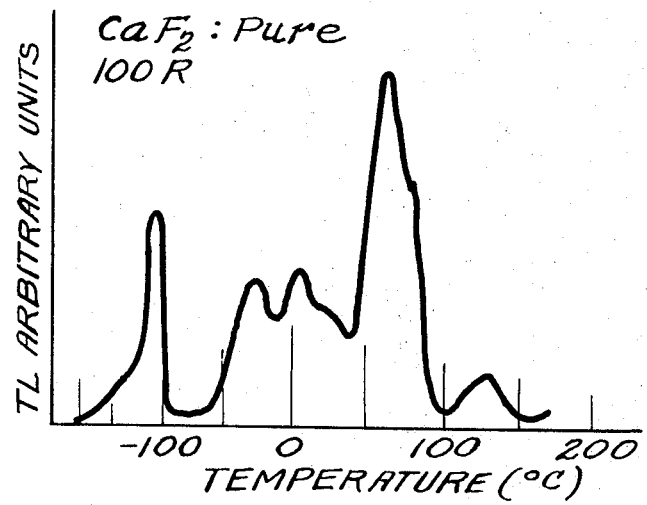
FIG. 3 is a glow curve of $CaF_2$:Pure produced by X-radiation at a cryogenic temperature.

To read the thermoluminescence stored in the phosphor, port 35 is uncovered and the temperature of the phosphor raised by passing warm nitrogen gas through sample block 33. The flow enters section 39 and is discharged from section 41. In this reversed nitrogen gas flow, sheath 43 prevents the gas from being cooled prior to heating the phosphor. The photon count at various temperatures is recorded and a glow curve plotted to determine radiation exposure. A typical glow curve for a purified $CaF_2$ phosphor (Harshaw Chemical Co. $CaF_2$:Pure) is shown in FIG. 3. This curve was produced by X-ray exposure of the phosphor at liquid nitrogen temperature to illustrate glow peaks below ambient temperature. As will be discussed below, these peaks are significantly pertinent in the determination of fast neutron fluence in the presence of thermal neutrons.

An alternate method of reading the radiation energy stored within the phosphor materials arises when phosphors selected for use are those which as dielectric solids exhibit electret polarization and depolarization lives of 14 days and 140 minutes, respectively.

A number of available phosphors that can be employed in measuring neutron flux are given in Table I. The neutron activation reaction, threshold energy of neutron capture and other characteristics are presented. The radioisotopes produced in these reactions are well suited for determining neutron flux, since each primarily decays by electron ($\beta^-$) or positron ($\beta^+$) emissions which are strongly absorbed in the host phosphors to produce thermoluminescence.

TABLE I

| PHOSPHOR | REACTION | THRESHOLD | CROSS SECTION* (barns) | DECAY MODE | HALF-LIFE |
|---|---|---|---|---|---|
| $^7$LiF (TLD-700) | $F^{19}(n,2n)F^{18}$ | 11 MeV | $5 \times 10^{-2}$ | $\beta^+$, .64 MeV | 109 min |
| CaF$_2$:Pure | $F^{19}(n,2n)F^{18}$ | 11 MeV | $5 \times 10^{-2}$ | $\beta^+$, .64 MeV | 109 min |
| CaF:Dy (TLD-200) | $F^{19}(n,2n)F^{18}$ | 11 MeV | $5 \times 10^{-2}$ | $\beta^+$, .64 MeV | 109 min |
| | $Dy^{164}(n,\gamma)Dy^{165}$ | Thermal | $2.8 \times 10^3$ | $\beta^-$, 1.3 MeV | 140 min |
| CaF$_2$:Mn | $F^{19}(n,2n)F^{18}$ | 11 MeV | $5 \times 10^{-2}$ | $\beta^+$, .64 MeV | 109 min |
| | $Mn^{55}(n,\gamma)Mn^{56}$ | Thermal | 13 | $\beta^-$, 2.8 MeV | 2.5 hr |
| CaSO$_4$:Dy | $S^{32}(n,p)P^{32}$ | 2.5 MeV | $2.5 \times 10^{-1}$ | $\beta^-$, 1.7 MeV | 14 day |
| | $Dy^{164}(n,\gamma)Dy^{165}$ | Thermal | $2.8 \times 10^3$ | $\beta^-$, 1.3 MeV | 140 min |
| ZnO:Tm | $Zn^{64}(n,p)Cu^{64}$ | 4 MeV | $2 \times 10^{-1}$ | EC, $\beta^\pm$ .6 MeV | 12.8 hr |
| | $Zn^{68}(n,\gamma)Zn^{69}$ | Thermal | 1 | $\beta^-$, .9 MeV | 57 min |
| Mg$_2$SiO$_4$:Tb | $Mg^{24}(n,p)Na^{24}$ | 7 MeV | $2 \times 10^{-1}$ | $\beta^-$, 2.8 MeV | 15 hr |
| Al$_2$O$_3$ | $Al(n,\alpha)Na^{24}$ | 8.7 MeV | $1.3 \times 10^{-1}$ | $\beta^-$, 2.8 MeV | 15 hr |

*Cross sections are given at 14 MeV for fast neutron activations.

effects. Such phosphor materials include, for example, CaF$_2$, SrF$_2$ and MgF$_2$. After these materials have been irradiated and annealed to release the energy resulting from prompt radiation, they are subjected to an electrical potential of about 1,000 volts while cooling from above 200° C. to below about 100° C. This treatment causes the phosphor materials to retain a strong electret polarization. On subsequent storage under shielded conditions at a cryogenic temperature as described above, the radiation from activated radioisotopes produces detectable peaks of radiation-induced depolarization. These peaks can be thermally activated at, for instance, temperatures of −150° C. to 200° C. and read as electrical current with a picoammeter. Thermogram plots of temperature versus current readings can be prepared and correlated to neutron radiation dose. These radiation-induced-thermally-activated-depolarization effects are more fully described in Science, "Radiation Dosimetry by a New Solid-State Effect," by E. B. Podgorsak and P. R. Moran, Vol. 179, pp. 380–382, January 26, 1973.

Another aspect of the present invention involves the use of a number of neutron-activable elements which have different energy thresholds for neutron absorption. In this manner, a spectrum of neutron energies can be approximated as well as the total neutron flux.

In selecting phosphors for use, a number of considerations are of importance. Each phosphor must include elements which can be activated by fast neutron capture to form radionuclides. If more than one radioisotope of interest is produced within a single phosphor, it is preferred that their half-lives differ significantly, that is by a factor of 10 or more. Such activated phosphors are read successively, once for each radioisotope present with separate storage periods preceding each reading. Thus, the radioisotopes with short half-lives can be allowed to substantially decay prior to reading the phosphor for the radioisotopes with longer half-lives. One phosphor that is particularly suited for this type of application is CaSO$_4$:Dy within which both S and Dy are activated to form radionuclides having half- Each of such phosphors is selected to include a neutron-activable element with a different neutron-capture threshold. The phosphors are exposed to a common field of radiation and are then annealed to remove the thermoluminescence attributable to prompt dose. After annealing, the phosphors are stored at a suitable temperature to capture a portion of the energy released by the decay of the activated element. The phosphors are then separately read to determine neutron spectra from the relative dose contributed by each activated element.

Various phosphors shown in Table I include conventional biasing agents such as Dy and Mn to provide trapped, thermoluminescent states that are releasable at temperatures substantially above ambient. Such compositions are prepared to minimize fade during storage at ambient temperature and to dominate other impurities and defects within the phosphors. Isotopes of these biasing agents, particularly Dy, have high cross sections for thermal neutrons and are useful in thermal and low-energy neutron dosimetry, but the decay of the resulting radioisotopes will often mask the decay of radionuclides produced by fast-neutron activation. In measuring fast neutron flux within a mixed radiation field having substantial flux of thermal neutrons, it is important to select phosphors without agents having high thermal neutron cross sections. Alternatively, such agents can be included as in CaSO$_4$:Dy where their thermal neutron activation products have relatively short half-lives and can be allowed to substantially decay prior to reading thermoluminescence resulting from fast-neutron, activation products.

In choosing phosphors which do not include biasing agents of high, thermal-neutron cross sections, alkali metal and alkali earth metal fluorides are of particular relevance to the present invention. As will be shown below, a $^7$LiF phosphor (Harshaw Chemical TLD-700) selectively responds to fast neutron radiation in the presence of thermal neutrons. In addition, certain purified phosphors of these fluorides have an improved response to many types of radiation due to the removal of unwanted impurities, thus diminishing the need for biasing agents.

As noted above, the sensitivity of these phosphors to radiation can be enhanced by irradiating at and reading the thermoluminescence from a cryogenic temperature. The enhancement in sensitivity is illustrated in FIG. 3, for purified $CaF_2$ (Harshaw Chemical Co. $CaF_2$:-pure) subjected to X radiation, by the thermoluminescent peaks that appear between cryogenic and ambient temperature. This particular phosphor exhibits an increase in sensitivity by a factor of two to three when these low-temperature peaks are included in the thermoluminescent reading. In a similar manner, LiF is found to produce about a thirtyfold increase in sensitivity. However, when irradiation occurs at ambient temperature, the low-temperature peaks are unavailable and the need for biasing agents becomes more important. Therefore, it will be seen that the method of the present invention is particularly well adapted to reap the benefits of this low-temperature, thermoluminescent response, since irradiation of the phosphors is a secondary event from contained radionuclides after the initial radiation exposure. Thus, the cryogenic storage is carried out in the laboratory in conjunction with the reading step, rather than in the field during exposure to the radiation in question.

It should also be noted that low-temperature, thermoluminescent peaks can be produced to enhance sensitivity in the biased as well as the purified phosphors. For example, the sensitivity of $Mg_2SiO_4$:Tb irradiated and read beginning at liquid nitrogen temperature is found to be about 70% greater than for irradiation at room temperature. In other phosphors, e.g. $CaF_2$:Mn and $CaF_2$:Dy, increases of about 30% and less than 10%, respectively, are found.

In order to determine the thermoluminescent sensitivity of various phosphor materials, each were irradiated with a cesium-137 source, a source of thermal neutrons and a fast neutron source. The cesium source was previously calibrated such that when irradiated at a known distance the photon count per unit of dose was readily obtained. The thermal neutron fluence from a test reactor was used and calibrated by gold foil activation. Fast neutrons were provided with a deuterium accelerator and a tritium target. The fast neutron flux was independently determined by fluorine, sulfur or copper activation. The following examples are presented merely to illustrate but not to limit the method of the present invention with these type sensitivity determinations.

SINGLE PHOSPHOR

EXAMPLE I

A 23 milligram ribbon of $^7$LiF (Harshaw Chemical Co. TLD-700) was exposed to the cesium-137 source for a sufficient period of time to produce a dose of 100 mR. The phosphor was read in a conventional reader device and the photon count per unit dose determined. In order to determine neutron sensitivity, the $^7$LiF phosphor was exposed to the thermal neutron source for 2 minutes and to the 14 MeV neutron source for about 10 minutes. After each exposure to neutron irradiation, the phosphor was annealed at 500°C. for about 5 minutes and stored for about 24 hours within a shielded vault at ambient temperature. The thermoluminescence was read for each exposure through a temperature range of about 120°C. to 250°C. The sensitivity of the phosphor was obtained from the photon counts and the neutron flux measurements. It was found that the $^7$LiF phosphor produced a count of 170 photons per $10^8$ n/cm$^2$ when exposed to the 14 MeV neutron source but was unresponsive to the thermal neutron source. Similar sensitivity determinations were made for a number of other phosphors and the results are tabulated in Table II.

TABLE II

EXPOSURE SENSITIVITIES #

| PHOSPHOR | MASS | Cs$^{137}$ GAMMA photons/mR | THERMAL NEUTRONS photons/$10^{10}$ n/cm$^2$ | 14 MeV NEUTRONS photons/$10^8$ n/cm$^2$ |
|---|---|---|---|---|
| $^7$LiF (TLD-700) | 23 mg | 360 | nil | 170 |
| $CaF_2$:Dy (TLD-200) | 27 mg | $1.3 \times 10^4$ | $4.0 \times 10^6$ | $4.0 \times 10^3$ |
| $CaF_2$:Mn | 50 mg | $5.7 \times 10^3$ | $8.0 \times 10^5$ | $1.7 \times 10^3$ |
| $CaSO_4$:Dy | 40 mg | $1.5 \times 10^4$ | $1.7 \times 10^6$ | $4.3 \times 10^{3*}$ |
| ZnO:Tm | 40 mg | $2.5 \times 10^4$ | $2.1 \times 10^4$ | $8.7 \times 10^3$ |
| $Mg_2SiO_4$:Tb | 20 mg | $1.6 \times 10^4$ | $1.6 \times 10^6$ | $1.1 \times 10^4$ |

*For one decay half-life.
These numbers are detected photons. The detection efficiency is of the order of 1%.

It can be seen from Table II that a number of phosphors can be used to determine fast neutron flux if thermal neutrons are not present. Where thermal neutrons are to be expected, discrimination can be achieved through use of a LiF phosphor which is unresponsive to thermal neutrons or the $CaSO_4$:Dy phosphor which forms thermal neutron activation products of relatively short half-lives in comparison to its principal fast neutron activation product. Where the other listed phosphor materials such as $CaF_2$ are to be used to determine fast neutrons in the presence of thermal neutrons, the biasing agents can be omitted and thermoluminescent peaks developed between cryogenic and ambient temperatures.

GROSS FEATURES OF A FAST NEUTRON SPECTRUM

EXAMPLE II

A neutron source with a diverse spectrum of neutron energies was prepared. This source comprised a 14 MeV source disposed at the center of an approximate sphere built up to a radius of 20 cm with 2 cm blocks of polyethylene containing about 1% boron. The neutron spectrum at various points in the sphere was calculated by conventional techniques. The 14 MeV component of the spectrum was calibrated with the fluorine activation technique counted with a conventional NaI:Tl crystal well counter and the calculated spectrum normalized to these measured values.

Four chips of $^7$LiF phosphors (Harshaw Chemical Co. TLD-700), two $Mg_2SiO_4$:Tb dosimeters, about 150 mg $CaSO_4$:Dy in gelatine capsules, and about 100 mg of ZnO:Tm also encapsulated, were placed within the polyethylene sphere at 5 cm, 10 cm, and 20 cm from the neutron source at the sphere's center. After about a 10 minute exposure all of the phosphors were removed from the sphere and annealed at 500° C. for 5 minutes. The powdered dosimeters were reencapsulated in new gelatine capsules and wrapped in lead foil. Each of the dosimeters were then placed in a shielded chamber and maintained at ambient temperature for various periods, that is, 24 hours for $^7$LiF, 48 hours for $Mg_2SiO_4$:Tb and ZnO:Tm, and 14 days for $CaSO_4$:Dy. After each period the respective dosimeters were removed and the thermoluminescence read and calibrated as previously described. In addition, the $CaSO_4$:Dy was annealed after 24 hours to remove the dose from the Dy decay. Had there been appreciable low-energy neutron fluence, the $CaSO_4$:Dy could have been read after 24 hours decay to assist in determining that contribution in the neutron energy spectrum.

There are a number of methods by which activation measurements can be analyzed to obtain neutron energy spectrum. Since thermoluminescence can be considered as a sum of contributions from neutrons in various energy ranges, a sequence of energy intervals can be established and an effective cross section calculated for each interval with each reaction. The cross section is assumed to be constant for the entire interval. Analysis of the data obtained from Example II begins with the highest energy interval, in the instant case 11 to 14 MeV measured by the $^7$LiF dosimeter and checked by the well counter. The other energy intervals are determined by the threshold energy of each of the other phosphors to the threshold energy of the $^7$LiF phosphor, that is, 7–11 MeV, 4–11 MeV, and 2–11 MeV.

The thermoluminescent measurements are expressed as neutron fluence in the highest energy interval for each phosphor and the fluence at each of the lower energy intervals determined as the difference between that at the highest energy interval for each phosphor and that determined by the $^7$LiF phosphor. These results at the various distances from the polyethylene sphere center are compared with calculated values in Tables III, IV and V.

TABLE III

FLUENCE AT 5 CM ($10^9$ N/CM$^2$)

| SAMPLE | 11–14 MeV | 7–11 MeV EXPTL | 7–11 MeV CALC | 4–11 MeV EXPTL | 4–11 MeV CALC | 2–11 MeV EXPTL | 2–11 MeV CALC |
| --- | --- | --- | --- | --- | --- | --- | --- |
| WELL COUNTER | 66 | | | | | | |
| TLD-700 | 65 | | | | | | |
| $Mg_2SiO_4$:Tb | 82 | 16 | 11 | | | | |
| ZnO:Tm | 70 | | | 4 | 11 | | |
| $CaSO_4$:Dy | 92 | | | | | 21 | 24 |

TABLE IV

FLUENCE AT 10 CM ($10^9$ N/CM$^2$)

| SAMPLE | 11–14 MeV | 7–11 MeV EXPTL | 7–11 MeV CALC | 4–11 MeV EXPTL | 4–11 MeV CALC | 2–11 MeV EXPTL | 2–11 MeV CALC |
| --- | --- | --- | --- | --- | --- | --- | --- |
| WELL COUNTER | 12 | | | | | | |
| TLD-700 | 11 | | | | | | |
| $Mg_2SiO_4$:Tb | 15 | 3 | 3.6 | | | | |
| ZnO:Tm | 15 | | | 3 | 6.2 | | |
| $CaSO_4$:Dy | 26 | | | | | 13 | 8.6 |

TABLE V

FLUENCE AT 20 CM ($10^9$ N/CM$^2$)

| SAMPLE | 11–14 MeV | 7–11 MeV EXPTL | 7–11 MeV CALC | 4–11 MeV EXPTL | 4–11 MeV CALC | 2–11 MeV EXPTL | 2–11 MeV CALC |
| --- | --- | --- | --- | --- | --- | --- | --- |
| WELL COUNTER | 1.3 | | | | | | |
| TLD-700 | 1.1 | | | | | | |
| $Mg_2SiO_4$:Tb | 1.7 | 0.4 | 0.57 | | | | |
| ZnO:Tm | 4.6 | | | 3 | 1.1 | | |
| $CaSO_4$:Dy | 3.2 | | | | | 1.2 | 1.4 |

It can be seen from the above three tables that characteristics of neutron spectra can be determined through neturon activation of thermoluminescent dosimeters. Iterative computer techniques may be of value where large numbers of different phosphors are employed to provide data over narrow energy intervals. Even with the above data, neutron fluence within the 2–4, 2–7 and 4–7 energy intervals can be determined.

It can be seen that the present invention provides a method for determining fast neutron flux in the presence of thermal neutrons and other types of radiation. The determinations are made by neutron activation of nuclides within thermoluminescent phosphors and subsequent measurement of the self-irradiation dose. Gross features of neutron spectra can also be measured through use of several phosphors having nuclear species with different threshold energies for neutron capture. The sensitivity of these measurements are enhanced by allowing the self-irradiation to occur while maintaining the phosphors at cryogenic temperatures and by beginning the thermoluminescence readings at the low temperature.

The embodiments of the invention in which an exclusive property or privilege is claimed are defined as follows:

1. A method of determining the fluence of fast neutrons within a mixed radiation field comprising:
   a. exposing a thermoluminescent phosphor to said radiation field to produce radioisotopes and a first amount of stored, radiation energy within said phosphor;
   b. annealing said phosphor at a temperature effective to release said first amount of stored, radiation energy;
   c. shielding said phosphor from radiation for a sufficient period of time and at a temperature effective to produce a detectable, second amount of stored, radiation energy from the decay of said radioisotopes;
   d. heating said phosphor over an effective temperature range to release said second amount of stored, radiation energy; and
   e. reading the released energy to determine fast neutron fluence.

2. The method of claim 1 wherein both said first and second amounts of stored radiation energy are released as thermoluminescence and are photometrically read to determine total radiation flux and fast neutron fluence.

3. The method of claim 1 wherein said step of shielding said phosphors is accomplished by maintaining said phosphors at a cryogenic temperature and both said heating and reading steps are begun at said cryogenic temperature.

4. The method of claim 1 wherein the temperature at which said annealing step is performed is in excess of the temperature range at which said subsequent heating step is performed.

5. The method of claim 1 wherein said phosphor consists of a substantially pure metallic fluoride salt, said salt being maintained at a temperature below 100° K. while said second amount of stored radiation energy is produced.

6. The method of claim 5 wherein said phosphor consists essentially of $CaF_2$.

7. The method according to claim 1 wherein a plurality of said phosphor materials each having a different energy threshold for neutron absorption are exposed, annealed, shielded, heated and photometrically read to determine energy spectrum of said neutron fluence.

8. The method of claim 7 wherein said plurality of phosphor materials comprise $^7LiF$, $Mg_2SiO_4$:Tb, ZnO:Tm and $CaSO_4$:Dy.

9. The method of claim 1 wherein said step of shielding said phosphor is performed at near ambient temperature and said phosphor is selected from the group of phosphor materials comprising $^7LiF$ and $CaSO_4$:Dy.

10. The method of claim 9 wherein said phosphor is $CaSO_4$:Dy and said steps of heating and reading said phosphor are performed after shielding for a period of one day to determine thermal neutron fluence and again after fourteen days to determine fast neutron fluence.

* * * * *